US010739770B2

(12) United States Patent
Tan et al.

(10) Patent No.: US 10,739,770 B2
(45) Date of Patent: Aug. 11, 2020

(54) AUTONOMOUSLY-CONTROLLED INSPECTION PLATFORM WITH MODEL-BASED ACTIVE ADAPTIVE DATA COLLECTION

(71) Applicant: General Electric Company, Schenectady, NY (US)

(72) Inventors: Huan Tan, Clifton Park, NY (US); Ana Dasilva, Schenectady, NY (US); Eric Gros, Waukesha, WI (US); Romano Patrick, Niskayuna, NY (US); Charles Theurer, Alplaus, NY (US); Mauricio Castillo-Effen, Rexford, NY (US); John Lizzi, Wilton, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 326 days.

(21) Appl. No.: 15/872,582

(22) Filed: Jan. 16, 2018

(65) Prior Publication Data
US 2019/0220019 A1    Jul. 18, 2019

(51) Int. Cl.
*G05D 1/02*    (2020.01)
*G01M 1/00*    (2006.01)
(Continued)

(52) U.S. Cl.
CPC ......... *G05D 1/0202* (2013.01); *B64C 39/024* (2013.01); *G01M 1/00* (2013.01);
(Continued)

(58) Field of Classification Search
USPC .......................................................... 701/3
See application file for complete search history.

(56) References Cited

U.S. PATENT DOCUMENTS 4,818,990 A    4/1989 Fernandes
9,162,753 B1    10/2015 Panto et al.
(Continued)

FOREIGN PATENT DOCUMENTS

CN    103163881 A    6/2013

OTHER PUBLICATIONS

He, Ruijie et al., "Planning in Information Space for a Quadrotor Helicopter in a GPS-denied Environment," Robotics and Automation, 2008. ICRA 2008. IEEE International Conference on, 2008, Pasadena, CA, (pp. 1814-1820, 7 total pages).
(Continued)

*Primary Examiner* — Tyler D Paige
(74) *Attorney, Agent, or Firm* — Fletcher Yoder, P.C.

(57) ABSTRACT

Modifying a motion plan for an autonomously-operated inspection platform (AIP) includes obtaining sensor data for an industrial asset area of interest, analyzing the obtained sensor data during execution of an initial motion plan to determine if modification of the initial motion plan is required. If modification is required then performing a pose estimation on a first group of potential targets and a second group of potential targets, optimizing the results of the pose estimation to determine a modification to the initial motion plan, performing reactive planning to the initial motion plan to include the modification, the reactive planning providing a modified motion plan that includes a series of waypoints defining a modified path, and autonomously controlling motion of the AIP along the modified path. The analysis, pose estimation, optimization, and reactive planning occurring during movement of the AIP along a motion plan. A system and computer-readable medium are disclosed.

17 Claims, 3 Drawing Sheets

(51) Int. Cl.
  *B64C 39/02* (2006.01)
  *G05D 1/00* (2006.01)

(52) U.S. Cl.
  CPC ...... *G05D 1/0094* (2013.01); *B64C 2201/123* (2013.01); *B64C 2201/126* (2013.01); *B64C 2201/127* (2013.01); *B64C 2201/141* (2013.01)

(56) References Cited

U.S. PATENT DOCUMENTS

| | | | |
|---|---|---|---|
| 9,352,833 B2 | 5/2016 | Kruglick | |
| 9,508,263 B1* | 11/2016 | Teng | B64C 39/024 |
| 9,609,288 B1* | 3/2017 | Richman | H04N 7/183 |
| 9,738,381 B1 | 8/2017 | Loud et al. | |
| 9,847,032 B2 | 12/2017 | Postrel | |
| 9,852,639 B2 | 12/2017 | Teng et al. | |
| 9,853,713 B2 | 12/2017 | Jalali | |
| 9,959,771 B1* | 5/2018 | Carlson | G08G 5/0039 |
| 10,053,218 B2 | 8/2018 | Feldmann et al. | |
| 2005/0149231 A1* | 7/2005 | Pretlove | B25J 9/1671 |
| | | | 700/264 |
| 2008/0125920 A1* | 5/2008 | Miles | B64C 39/024 |
| | | | 701/2 |
| 2010/0010948 A1* | 1/2010 | Ito | G06N 3/0454 |
| | | | 706/20 |
| 2011/0054689 A1* | 3/2011 | Nielsen | G05D 1/0088 |
| | | | 700/258 |
| 2016/0282872 A1* | 9/2016 | Ahmed | B64C 39/024 |
| 2017/0110014 A1* | 4/2017 | Teng | B64C 39/024 |
| 2017/0285627 A1* | 10/2017 | Feldmann | H04B 7/1851 |
| 2017/0337824 A1* | 11/2017 | Chen | G08G 5/0086 |
| 2017/0372256 A1 | 12/2017 | Kantor et al. | |
| 2018/0005535 A1* | 1/2018 | Kalathil | B64C 39/024 |
| 2018/0259955 A1* | 9/2018 | Noto | B64C 39/024 |
| 2018/0322699 A1* | 11/2018 | Gray | G06T 19/003 |
| 2018/0330027 A1* | 11/2018 | Sen | B08B 13/00 |
| 2018/0357909 A1* | 12/2018 | Eyhorn | G08G 5/0034 |
| 2019/0145902 A1* | 5/2019 | Tan | G01N 21/8803 |
| | | | 702/35 |
| 2019/0146462 A1* | 5/2019 | Tan | G05B 19/4183 |
| | | | 700/257 |
| 2019/0220019 A1* | 7/2019 | Tan | B64C 39/024 |
| 2019/0228573 A1* | 7/2019 | Sen | G01B 15/04 |
| 2019/0384283 A1* | 12/2019 | Chowdhary | G06F 16/29 |

OTHER PUBLICATIONS

Bonnin-Pascual, Francisco et al., "Semi-Autonomous Visual Inspection of Vessels Assisted by an Unmanned Micro Aerial Vehicle," Intelligent Robots and Systems (IROS), 2012 IEEE/RSJ International Conference on, 2012, Vilamoura, (pp. 3955-3961, 6 total pages).

Shukla, Amit et al., "Autonomous Tracking and Navigation Controller for an Unmanned Aerial Vehicle Based on Visual Data for Inspection of Oil and Gas Pipelines", Control, Automation and Systems (ICCAS), 2016 16th International Conference on, 2016, Gyeongju, (pp. 194-200, 7 total pages).

Cacace, Jonathan et al., "Aerial service vehicles for industrial inspection: task decomposition and plan execution", Appl Intell, (2015), No. 42, DOI 10.1007/s10489-014-0542-0, (pp. 49-62, 14 total pages).

Ortiz, Alberto et al., Article: "Vision-Based Corrosion Detection Assisted by a Micro-Aerial Vehicle in a Vessel Inspection Application", Senors 2016, 16, 2118, DOI: 10.3390/s16122118, (pp. 1-29, 29 total pages), www.mdpi.com/journal/senors.

Koo, T. J. et al., "Hybrid Control of an Autonomous Helicopter", Department of Electrical Engineering and Computer Science, 6pgs.

PCT/US2018/066045; International Search Report and Written Opinion dated Apr. 8, 2019; pp. 1-15.

\* cited by examiner

AUTONOMOUSLY-CONTROLLED INSPECTION PLATFORM WITH MODEL-BASED ACTIVE ADAPTIVE DATA COLLECTION

BACKGROUND

In one conventional approach to industrial asset inspection, an unmanned aerial vehicles (UAV) is flown around industrial assets while obtaining pictures and/or collecting sensory data. The conventional approach implements UAV motion planning as tightly related to the targets-of-interest regions. Conventional motion planning methods implement a simple approach that consists of: defining the industrial asset's target(s)-of-interest; mapping a selected observation point to a corresponding waypoint on the path of a UAV; and connecting the waypoints in three dimensional space to generate the UAV's predetermined flight plan. This conventional UAV flight plan enables the UAV to fly a deliberate, preset path along the waypoints. At the waypoints, the UAV can acquire pictures of an industrial asset at viewing angles fixed in space by the flight plan.

Conventionally, a deliberative pre-flight planning process can be deployed to optimize the UAV's flight path to assure all waypoints can be achieved. This conventional, deliberative pre-flight planning results in a predetermined flight path that is not altered during the UAV's execution of the path. Such a locked flight plan cannot guarantee that all targets-of-interest can be captured during the actual inspection performed along the flight path.

This failure to capture all targets can be due to the imperfect knowledge of inspectors. For example, upgrades and/or reconfiguration can render knowledge of the industrial asset's real-world physical configuration inconsistent with the model used by conventional approaches to predetermine the UAV flight plan. Further, even if an accurate physical model is used to generate the model, an industrial asset can develop new corrosion areas, cracks, and other defects at locations unknown at the time the predetermined flight plan is rendered by the inspector setting the flight plan parameters. A UAV following a conventionally predetermined flight plan is incapable of autonomously altering its path based on real-time captured pictures and/or sensor data.

DETAILED DESCRIPTION

Embodying systems and methods provide an autonomously-operated inspection platform (e.g., robot, UAV, drone, and the like) the capability to perform an in-motion adaptation to modify its data collection motion plan (e.g., a flight plan). This in-flight modification to the flight plan can result from analysis performed on data collected along its flight path. By adaptive in-flight modification of the flight plan additional data can be collected. This collection of additional data by an embodying autonomously-operated inspection platform (AIP) can achieve an increased accuracy over conventional autonomous inspection techniques, which merely follow a predetermined flight plan. Embodying systems and methods implement a real-time approach to adaptively alter the AIP's flight plan based on collected sensory data using predefined metrics and/or pretrained models.

For purposes of this discussion, embodying systems and methods are described with regard to a UAV inspection platform implementation. However, the invention is not so limited. It should be readily understood that other types, forms, and approaches of AIPs are within the scope of this disclosure (including, but not limited to, airborne, ground-based, submersible, and insertable platforms).

Embodying systems and methods are applicable to the survey of industrial assets of various types and natures. For example, an industrial asset can be a chemical plant, a processing plant, an automated manufacturing plant, a dam, a bridge, a power generation plant, an electrical power distribution grid, an electrical substation, a pipeline, a pumping station, etc. An industrial asset can be exposed to its surroundings (i.e., under open sky), enclosed under a roof, and/or within walls.

Figure 1A:
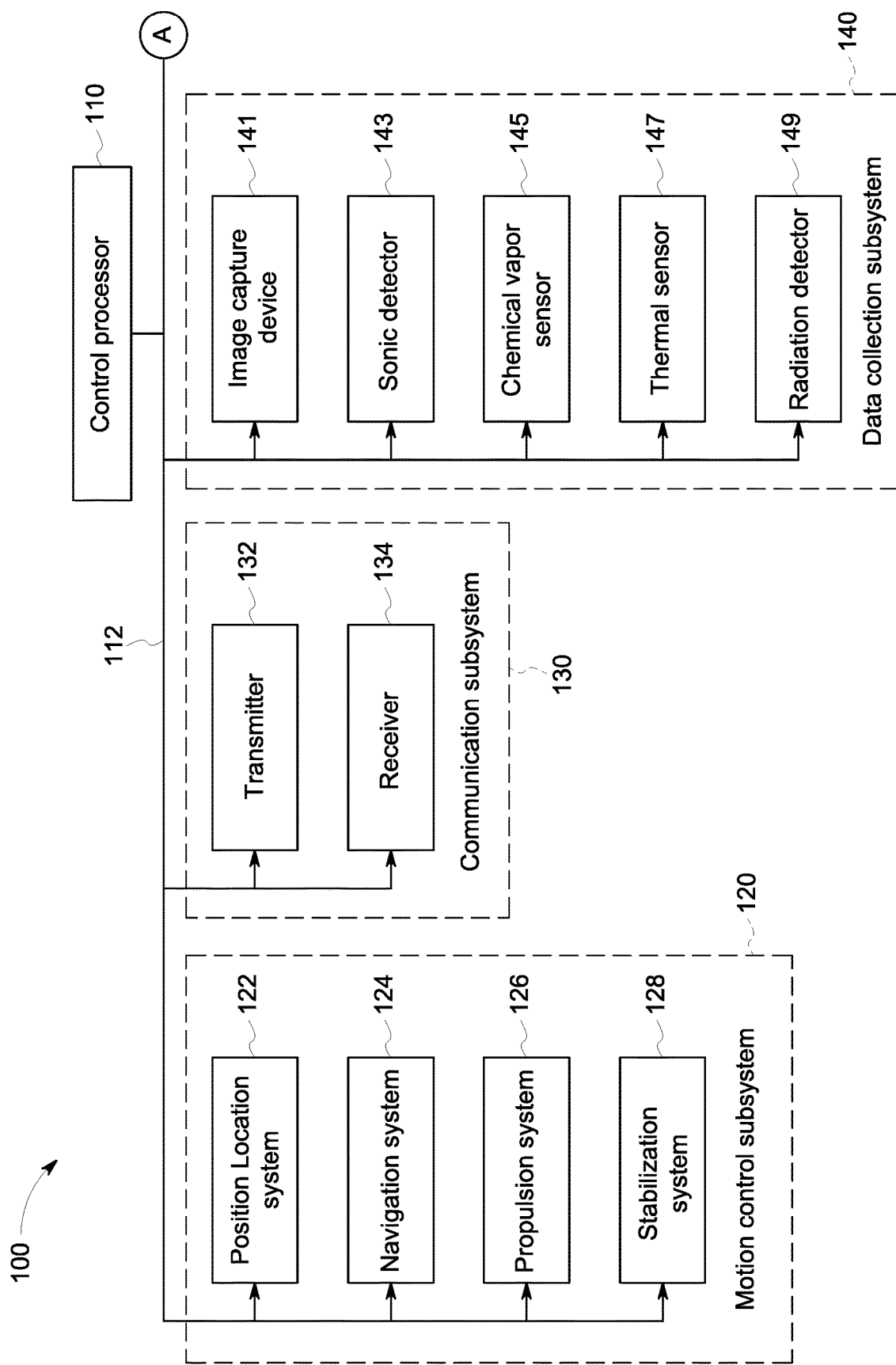
FIGS. 1A-1B depict a structural block diagram for an autonomously-operated inspection platform in accordance with embodiments.
Figure 1B:
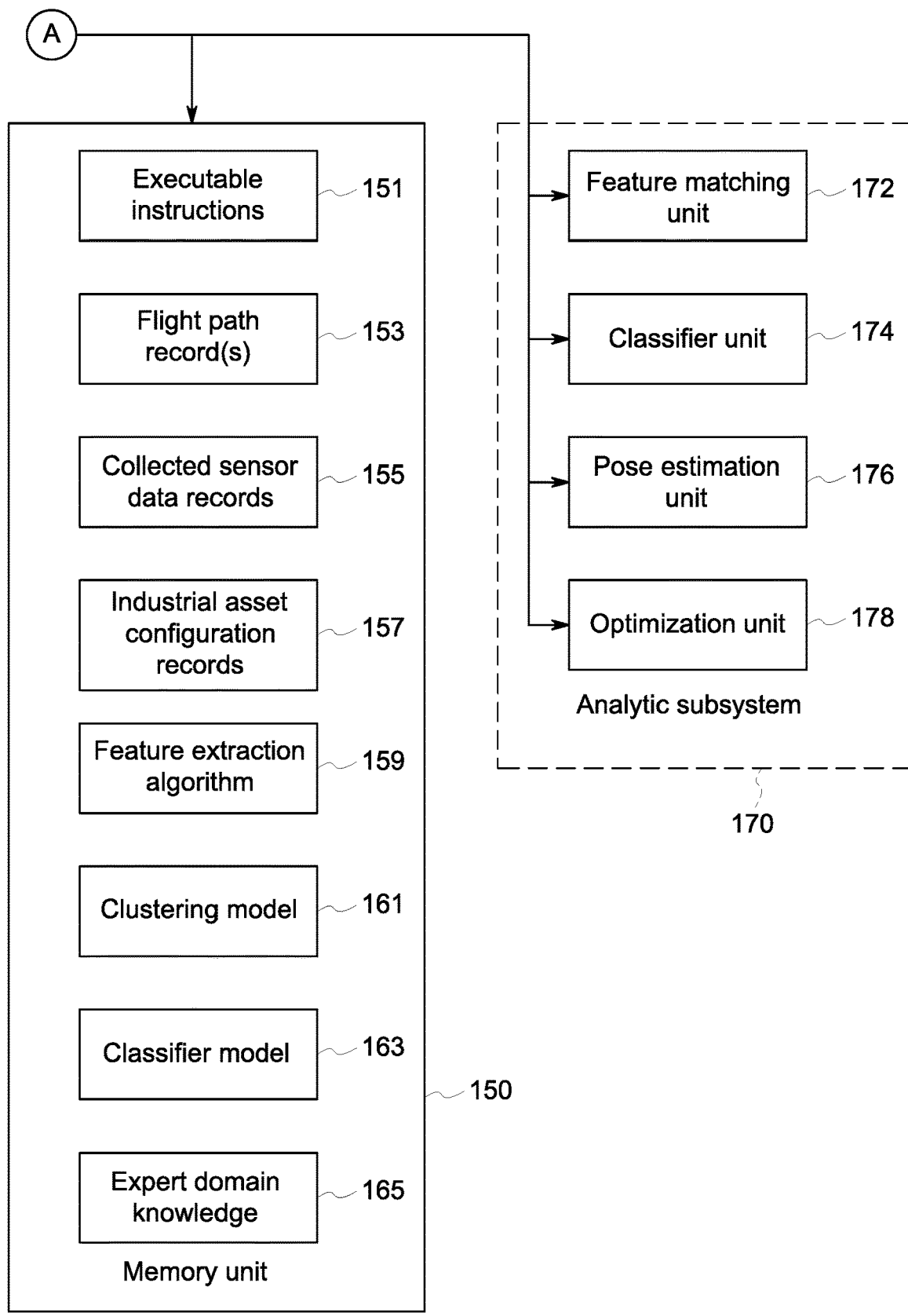

FIGS. 1A-1B depict a structural block diagram for autonomously-operated inspection platform 100 in accordance with embodiments. AIP 100 can include control processor 110 in communication with other components of the AIP across data/control bus 112. The control processor can be, for example, a microprocessor, a microcontroller, a field programmable gate array, discrete analog circuitry, digital circuitry, an application specific integrated circuit, a digital signal processor, a reduced instruction set computer processor, a single-board computer, etc.

Operation, communication and other functions of the AIP can be performed under the control of control processor 110 by execution of executable instructions 151 located in memory unit 150.

Communication system 130 can include transmitter 132 and receiver 134. In some implementations, these communication system components can be combined in a transceiver. Communication system can provide wireless communication (radio, cellular, Bluetooth, and the like) between the AIP and external devices (e.g., remote server and data store, user terminal, image/data display devices, etc.) across an electronic communication network. The electronic communication network can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication system. It should be recognized that techniques and systems disclosed herein are not limited by the nature of the electronic communication network.

AIP 100 includes motion control subsystem 120. Position location system 122 determines the spatial location of the AIP. The location can be based on a satellite system, such as global positioning system (GPS), or other beacon system.

Propulsion system 126 includes mechanical drive components that power and propel the AIP—dependent on the AIP configuration, these components can include, for example, engine, turbine, drive train, servos, fuel pumps, wheels/tracks, rotary wing(s), propellers, etc. Stabilization system 128 can include accelerometers, inclinometers, gyroscopes, and other devices that can measure and/or maintain the physical orientation of the AIP for up to six degrees of freedom (i.e., x-plane, y-plane, z-plane, roll, pitch, and yaw).

Navigation system 124 can access information from the position location and stabilization system to determine the control signals needed for the propulsion system to maintain the AIP along its flight path. In accordance with embodiments, the AIP's flight path can be dynamically altered during its execution based on analysis of data collected by one or more sensors as the AIP traverses its path. The flight path (original and/or dynamically altered) can be stored in flight path record(s) 153.

Data collection subsystem 120 can be mounted on and/or within, the AIP. Various sensors can be included in the data collection subsystem based on measurement requirements of the industrial asset configuration being monitored. Examples of sensors can include, but are not limited to, image capture device 141 (e.g., optical, RGB, HD, IR, FLIR, etc.), sonic detector 143 (subsonic, audible, and/or ultrasonic spectrums), chemical vapor sensor 145, thermal sensor 147, and radiation detector 149 (radioactive, particle, Gamma ray, X-ray, etc.).

Embodying systems and methods provide dynamic adjustment of flight path based on analysis of captured images and other data during traverse of the flight path. This analysis can be performed by analytic subsystem 170, which includes feature matching unit 172, classifier unit 174, and pose estimation unit 176. Components within the analytic subsystem can access flight path record(s) 153, collected sensor data records 155, industrial asset configuration records 157, feature extraction algorithm 159, clustering model 161, and classifier model 163.

It should be understood that embodying systems can be implemented by distinct or integrated software and/or hardware modules. In some implementations, one or more of the various subsystems and their component units can include local computing processors separate from control processor 110. Embodiments may be implemented with fewer or additional subsystems and their component units, modules, and hardware configurations.

Figure 2:
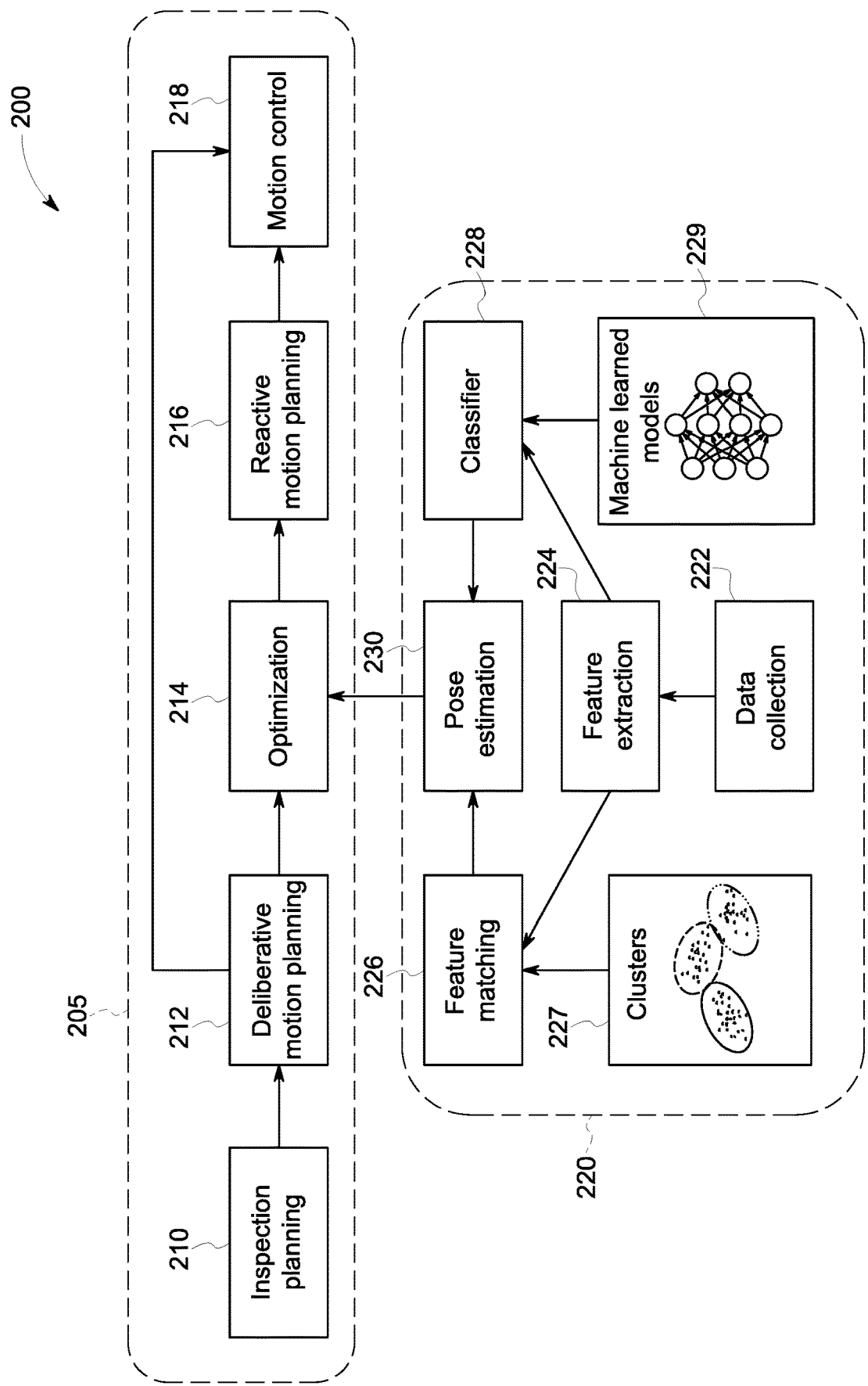
FIG. 2 depicts a process block diagram for dynamic alteration of a flight plan of an autonomously-operated inspection platform in accordance with embodiments.

FIG. 2 depicts a block diagram of dynamic flight plan alteration process 200 to optimize an AIP flight plan during its execution in accordance with embodiments. Process 200 can be conceptually-partitioned into two phases: deliberative inspection phase 205, and adaptive inspection phase 220. In accordance with embodiments, process 200 can be performed by one or more components of analytic subsystem 170 (e.g., feature matching unit 172, classifier unit 174, pose estimation unit 176, and optimization unit 178). These components can access flight path record(s) 153, collected sensor data records 155, industrial asset configuration records 157, feature extraction algorithm 159, clustering model 161, and classifier model 163.

An inspector defines an inspection plan, block 210, to obtain data on targets-of-interest for an industrial asset. The plan can be based on the inspector's experience and knowledge of the asset. This knowledge can be informed by the industrial asset's configuration records, which can be provided to the AIP's memory unit 150 for storage in industrial asset configuration records 157. The position, the observation angle, and the distance of each target-of-interest are defined in this inspection plan. The inspection plan includes waypoints for an initial motion plan specifying an AIP path, which is provided to flight plan records 153 on the AIP.

In accordance with embodiments, deliberative motion planning block 212 computes a six-dimensional transformation (e.g., for a UAV AIP) on the initial flight path to specify position and orientation of sensors along the flight path. This computation can ensure that the UAV is maneuvered into orientations that can maximize the sensor monitoring the targets-of-interest. The deliberative motion planning executes the UAV flight plan along the waypoints to gather images and/or other monitored data.

This deliberative motion planning, and its execution, cannot guarantee that all targets-of-interest can be captured during the inspection. For example, the inspector's knowledge can be imperfect; and/or there can be discrepancies between the industrial asset's physical configuration and information in its configuration record due to modifications. Even if the inspector's knowledge and the configuration records are accurate, unexpected defects can develop in the industrial asset due to factors (e.g., normal wear, corrosion, poor maintenance, cracking, etc.). Conventional inspection techniques are limited by merely instructing a UAV to follow a predetermined flight plan that cannot be adjusted for unknown configurations and unexpected defects. However, embodying systems and methods overcome this limitation of the conventional approaches by providing to the UAV a capability to analyze data collected during flight and adaptively adjust the flight plan to alter the initial waypoints, thus improving the overall inspection of the industrial asset.

In accordance with embodiments, if during the flight there are no unknown configurations nor unexpected defects encountered, optimization block 214 and reactive motion planning block 216 are bypassed. Motion control block 218 executes the initial flight path, under direction of the deliberative motion planning block, which performs motion planning during the UAV flight to determine if there is a need to alter its path. The motion planning can be performed continuously, at intervals (periodic or predetermined), and/or in response to sensor data.

In accordance with embodiments, adaptive inspection phase 220 includes analysis of data obtained by the sensors. The sensors can perform data collection block 222 by analog data collection (e.g., about continuously), or by collecting data at discrete points (e.g., at periodic or predetermined time and/or distance intervals). The collected sensor data can be stored in data records 155.

In accordance with embodiments, during execution of the flight plan, the flight path can be evaluated to determine that the sensors obtain sufficient data on targets-of interest designated in the initial flight plan, as well as targets-of-interest that are identified based on the ongoing analysis of collected sensor data In accordance with embodiments, feature extraction block 224 can process collected sensor data records 155 using feature extraction algorithm 159 during the UAV flight. In some implementations, faster processing can be achieved by performing feature extraction on data obtained by RGB or infrared cameras.

In some implementations, scale-invariant feature transform (SIFT) and speeded up robust features (SURF) techniques can be used to provide additional information on descriptors—for example, Oriented FAST and rotated BRIEF (ORB) feature extraction can be performed. In other implementations, simple color, edge, corner, and plane features can be extracted.

The extracted features can be provided to both feature matching block 226 and classifier block 228 for identification of potential defects in the features. Two models (clustering model 161 and classifier model 163) can be trained based on expert domain knowledge 165 and historical configuration data (for the same and/or similar type of industrial asset), which can be stored in industrial asset configuration records 157. In some implementations, these two models need not be complex and can provide preliminary defect detection.

The clustering model can be refined by applying historical data that can be, for example, geometric distribution of principal component features, and feature density distribution. The modeled clusters can be generated by the clustering model using industrial asset image data segmented to be a target template for modeling. The feature extraction algorithm 159 can apply, for example ORB techniques to detect lines, edges, and planes in the image. Then a Gaussian mixture model (GMM) can be used to cluster the extracted features, and generate cluster block 227. Cluster block 227 can include feature information—for example, two-dimensional GMM models with mean, variance, and the direction of the two major axes.

Feature extraction block 224 can apply feature extraction algorithm 159 to recognize clusters from real-time captured image data (data collection block 222). The feature extraction block can generate clusters applying the GMM technique, but from data captured during the UAV flight.

One pipeline of the feature extraction block will generate the same type of data, but the input is from the real-time data collection, when the UAV is flying. Feature Matching block 226 performs a comparison between the two-dimensional GMM models from clusters 227 and feature extraction 224. The comparison can be, for example, based on the density function between these two models. The result of the density function comparison can be assigned a similarity score, which can include a predetermined threshold range—e.g., densities within the range are considered a match. Based on the similarity score, potential targets and/or areas of interest can be identified.

A second pipeline of feature extraction block 224 can identify potential targets and/or areas of interest by applying classifier model 163 in classifier block 228 to machine learning models block 229, which can be support vector machine (SVM) trained models. The classifier block can consider color, texture, and edge features in identifying these potential targets. The classifier block performs a dynamic, real-time comparison between data obtained during the flight execution and the machine learning models. If a region is found to have a similarity ranking (within a predetermined range) based on similar color, texture, or edge, the classifier block identifies this region as a potential target for inspection. The classifier block can apply SVM model training to the feature extraction from block 224. Then the comparison is performed between the two sets of SVM models to identify the potential targets.

Pose Estimation block 230 identifies specific objects in the images of the potential targets from both feature matching block 226 and classifier block 228. The specific objects can be identified as priority inspection points by pose estimation unit 176. The pose (position and orientation relative to the UAV) of these inspection points can be estimated and provided to optimization block 214.

In accordance with embodiments, optimization unit 178 can implement optimization block 214 to determine alterations to the current flight path to capture sensor data for the inspection points identified by the feature matching and classifier blocks. These alterations can result in a modified flight plan that represents a sparse path connecting the locations. In accordance with embodiments, this image processing and analysis that results in a modified flight plan is performed dynamically during the real-time execution of the current flight plan. It should be readily understood, that additional alterations can be made during execution of the modified flight path.

Deliberative motion planning block 212 can also provide poses to the optimization block, resulting in two groups of poses: one from the deliberative motion planning block, and the other from the real-time analysis performed by the blocks within adaptive inspection phase 220, as described. Optimization unit 178 can re-plan the motion to coordinate these two groups into one cohesive flight plan.

In accordance with some implementations, the optimization unit can apply a closest neighbor method to add updated locations (that are generated during the UAV's execution of a current flight plan) to the current executing flight plan to result in an updated flight plan. The optimization process can minimize the flying time and maximize the coverage of all areas of interest. An optimized, updated flight plan can realize the constraint that all areas of interest are captured in at least one sensor data measurement. The optimization unit can provide a sequence of waypoints to reactive motion planning block 216. The reactive planning block can update the existing, currently executing flight plan with additional via points and corresponding orientations (up to six degrees of freedom) to capture the new areas of interest.

Reactive Planning can generate a flight path that avoids obstacles, if needed, based on industrial asset configuration records 157. The updated flight plan can be implemented with a proportional-integral-derivative (PID) controller providing motion control feedback to elements in motion control subsystem 120.

Embodying system and methods provide an AIP that implements model-based adaptive inspection data collection with real-time quantified metrics. This result can be achieved with real-time data processing to determine adaptive motion planning updates using an optimization technique that combines deliberative and reactive planning elements to maximize the inspection of areas of interest detected during execution of the flight plan. Conventional approaches merely analyze inspection results obtained during an unchanged predefined flight plan, where additional predefined flight plans can be executed if additional inspection point data is required.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform a method of dynamically in real-time adaptively alter an AIP's flight plan based on collected sensory data using predefined metrics and/or pre-trained models, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method of in-motion modification of an initial motion plan for an autonomously-operated inspection platform (AIP), the method comprising:
receiving, at a processor of the AIP, the initial motion plan, wherein the initial motion plan includes a series of initial waypoints defining an initial path about an industrial asset;
autonomously controlling, via the processor, movement of the AIP along the initial path;
obtaining, via a sensor of the AIP, sensor data for one or more areas of interest of the industrial asset;
determining, based on the sensor data and during execution of the initial motion plan, whether to modify the initial motion plan to include additional waypoints along which the AIP is to inspect one or more additional areas of interest of the industrial asset;
upon determining to modify the initial motion plan:
performing a pose estimation on a first group of potential targets and a second group of potential targets on the industrial asset;
optimizing results of the pose estimation to determine a modification to the initial motion plan; and
performing reactive planning to incorporate the modification into the initial motion plan, wherein incorporating the modification into the initial motion plan comprises adding the additional waypoints to the series of initial waypoints to define a modified path having an updated series of waypoints that includes the series of initial waypoints and the additional waypoints, wherein the additional waypoints are interspersed with the series of initial waypoints such that the modified path minimizes a travel time of the AIP through the updated series of waypoints; and
autonomously controlling movement of the AIP along the modified path.

2. The method of claim 1, wherein performing the pose estimation includes:
identifying at least one object of the industrial asset in at least one of the first group of potential targets and the second group of potential targets; and
identifying both a position and an orientation for the at least one object relative to a location of the AIP.

3. The method of claim 1, wherein the modified motion plan includes a position and an orientation of an object identified by the pose estimation, and wherein the position and the orientation determine a relative position of the AIP that enables the AIP to obtain additional sensor data for the object.

4. The method of claim 1, comprising extracting features from the sensor data collected while the AIP travels along at least one of the initial path and the modified path.

5. The method of claim 4, further comprising:
performing feature matching between a cluster and the features to obtain the first group of potential targets; and
applying a classifier model to a machine learning model and the features to obtain the second group of potential targets.

6. The method of claim 5, wherein the cluster represents a two-dimensional model of at least a portion of the industrial asset.

7. The method of claim 5, wherein the machine learning model represents a support vector machine model of at least a portion of the industrial asset.

8. A non-transitory computer readable medium having instructions stored thereon, wherein the instructions, when executed by a processor, cause the processor to:
receive an initial motion plan for an autonomously-operated inspection platform (AIP), wherein the initial motion plan includes a series of initial waypoints defining an initial path about an industrial asset;
autonomously control movement of the AIP along the initial path;
obtain, via a sensor of the AIP, sensor data for one or more areas of interest of the industrial asset;
determine, based on the sensor data and during execution of the initial motion plan, whether to modify the initial motion plan to include additional waypoints along which the AIP is to travel; and
upon determining to modify the initial motion plan:
perform a pose estimation on a group of potential targets on the industrial asset to determine both a position and an orientation of the group of potential targets relative to the AIP;
determine, based on both the position and the orientation of the group of potential targets, a modification to the initial motion plan, wherein the modification includes the additional waypoints, and wherein the additional waypoints define poses of the AIP, relative to the industrial asset, that enable the AIP to acquire sensor data of the group of potential targets; and
perform reactive planning to incorporate the modification into the initial motion plan to generate a modified motion plan that includes an updated series of waypoints defining a modified path; and
autonomously control movement of the AIP along the modified path.

9. The non-transitory computer readable medium of claim 8, wherein the instructions, when executed by the processor, cause the processor to extract features from the sensor data collected while the AIP travels along at least one of the initial path and the modified path.

10. The non-transitory computer readable medium of claim 9, wherein the instructions, when executed by the processor, cause the processor to:
perform feature matching between a cluster and the features to obtain the group of potential targets; and
apply a classifier model to a machine learning model and the features to obtain a second group of potential targets.

11. The non-transitory computer readable medium of claim 10, wherein the cluster represents a two-dimensional model of at least a portion of the industrial asset.

12. The non-transitory computer readable medium of claim 10, wherein the machine learning model represents a support vector machine model of at least a portion of the industrial asset.

13. The non-transitory computer readable medium of claim 8, wherein the poses of the AIP define six degrees of freedom of the AIP relative to the industrial asset at each of the additional waypoints, wherein the six degrees of freedom include x-plane coordinates of the AIP, y-plane coordinates of the AIP, z-plane coordinates of the AIP, roll angle of the AIP, pitch angle of the AIP, and yaw angle of the AIP.

14. A system for in-motion modification of an initial motion plan of an autonomously-operated inspection platform (AIP), the system comprising:
an AIP having a processor in communication with a memory unit, the memory unit including executable instructions stored thereon that, when executed by the processor, cause the processor to:

receive an initial motion plan for the AIP, wherein the initial motion plan includes a series of initial waypoints defining an initial path about an industrial asset;

autonomously control movement of the AIP along the initial path;

obtain, via a sensor of the AIP, sensor data for one or more areas of interest of the industrial asset;

determine, based on the sensor data and during execution of the initial motion plan, whether to modify the initial motion plan to include additional waypoints along which the AIP is to inspect one or more additional areas of interest of the industrial asset;

upon determining to modify the initial motion plan:
  perform a pose estimation on a first group of potential targets and a second group of potential targets on the industrial asset;
  optimize results of the pose estimation to determine a modification to the initial motion plan, wherein the modification includes the additional waypoints, and wherein the additional waypoints define poses of the AIP, with respect to the industrial asset, that maximize inspection coverage of the one or more additional areas of interest by the AIP; and
  perform reactive planning to incorporate the modification into the initial motion plan to generate a modified motion plan that includes an updated series of waypoints defining a modified path; and autonomously control movement of the AIP along the modified path.

15. The system of claim 14, wherein the executable instructions, when executed by the processor, cause the processor to:
  identify at least one object of the industrial asset in at least one of the first group of potential targets and the second group of potential targets; and
  identify both a position and an orientation for the at least one object relative to a location of the AIP.

16. The system of claim 14, wherein the executable instructions, when executed by the processor, cause the processor to
  extract features from the sensor data;
  perform feature matching between a cluster and the features to obtain the first group of potential targets; and
  apply a classifier model to a machine learning model and the features to obtain the second group of potential targets, wherein the cluster represents a two-dimensional model of at least a portion of the industrial asset and the machine learning model represents a support vector machine model of at least the portion of the industrial asset.

17. The system of claim 14, wherein the poses of the AIP define six degrees of freedom of the AIP relative to the industrial asset at each of the additional waypoints, wherein the six degrees of freedom include x-plane coordinates of the AIP, y-plane coordinates of the AIP, z-plane coordinates of the AIP, roll angle of the AIP, pitch angle of the AIP, and yaw angle of the AIP.

* * * * *